US006260609B1

(12) United States Patent
Takahashi

(10) Patent No.: US 6,260,609 B1
(45) Date of Patent: Jul. 17, 2001

(54) RADIATOR ATTACHMENT STRUCTURE

(75) Inventor: Akio Takahashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,282

(22) Filed: Feb. 24, 2000

(30) Foreign Application Priority Data

Feb. 24, 1999 (JP) .................................................. 11-047098

(51) Int. Cl.⁷ .................................. F28F 7/00; F28F 9/00; B60K 11/04; F16M 13/00
(52) U.S. Cl. .................................. 165/69; 165/67; 165/78; 180/68.4; 248/609
(58) Field of Search .................................. 165/67, 69, 78, 165/76; 180/68.4, 232; 248/608, 609

(56) References Cited

U.S. PATENT DOCUMENTS

| 4,417,635 | * | 11/1983 | Thepault | 180/68.4 |
| 4,541,645 | * | 9/1985 | Foeldesi | 180/68.4 |
| 4,579,184 | * | 4/1986 | Hiramoto | 180/68.4 |
| 4,741,392 | * | 5/1988 | Morse | 165/76 |
| 4,742,881 | * | 5/1988 | Kawaguchi et al. | 180/68.4 |
| 5,137,080 | * | 8/1992 | Haasch et al. | 165/76 |

FOREIGN PATENT DOCUMENTS

| 60-46335 | 4/1985 | (JP) | B60K/11/04 |
| 60-47826 | 4/1985 | (JP) | F01P/3/18 |

* cited by examiner

Primary Examiner—Ira S. Lazarus
Assistant Examiner—Tho Van Duong
(74) Attorney, Agent, or Firm—Sughrue, Mion, Zinn, Macpeak & Seas, PLLC

(57) ABSTRACT

A lower end of a radiator 21 is rotatably attached to a lower cross member 42 and an upper end of the radiator 21 is attached to an upper cross member 32, characterized in that a pin is erected on the upper end of the radiator, whereby a resilient supporting portion 31 is provided on the upper cross member 32 which resiliently supports the pin 26 and from which the pin 26 is disengaged when the radiator 21 is moved backward with a force equal to or greater than a certain magnitude. Thus, it is possible to construct the radiator such that no force is applied to an obstacle which is equal to or greater than a force resulting without the radiator attachment structure of the invention with no limitation being imposed to the structural design of a vehicle.

8 Claims, 9 Drawing Sheets

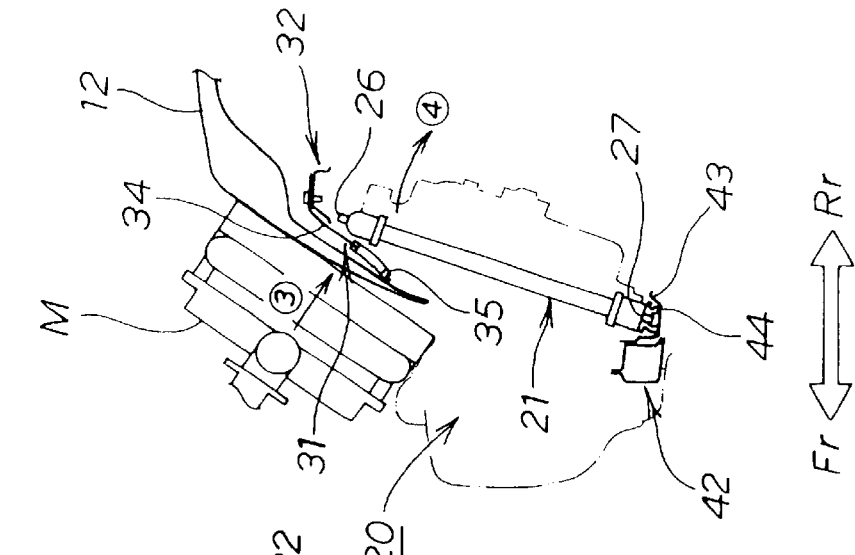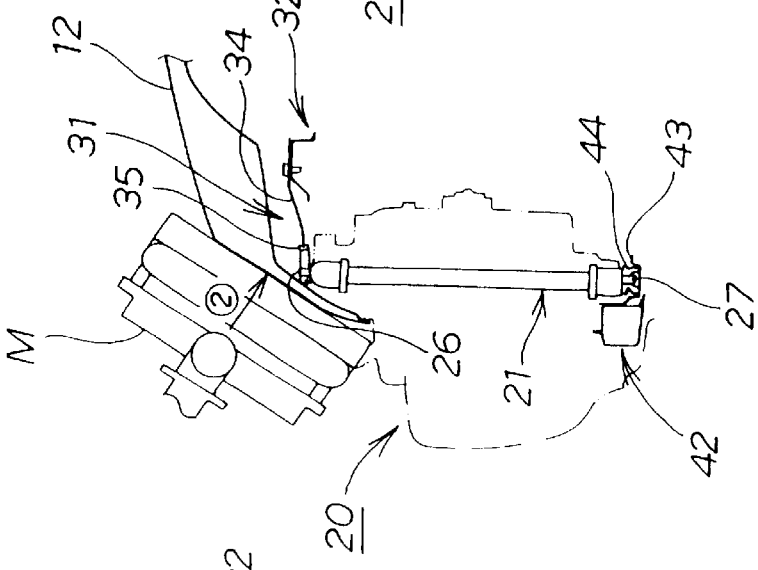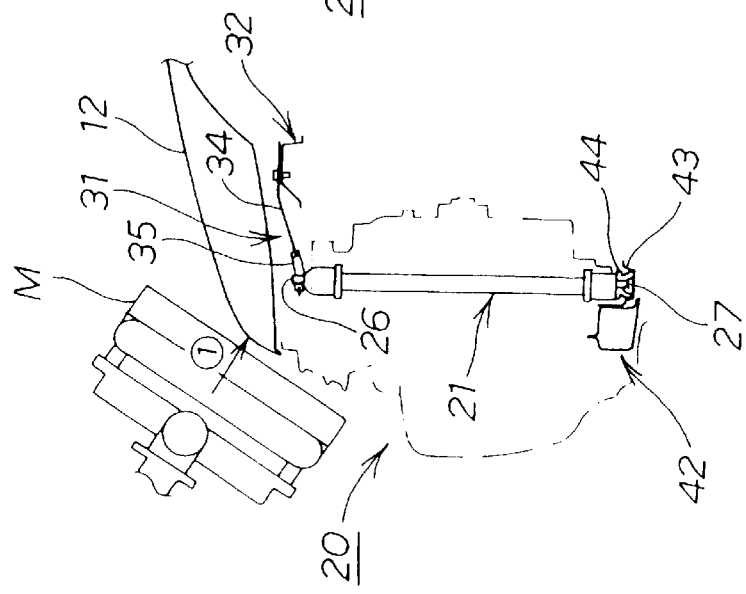

RADIATOR ATTACHMENT STRUCTURE

BACKGROUND OF THE INVENTION

The present invention relates to an improved attachment structure for a vehicle radiator.

Known as the attachment structure for a vehicle radiator are, for instance, "SUPPORTING STRUCTURE FOR AN AUTOMOBILE RADIATOR" disclosed in JP-A-60-46335U and "RADIATOR SUPPORT WITH A GAP ADJUSTMENT MECHANISM" disclosed in JP-A-60-47826U.

In the structure disclosed in the JP-A-60-46335U, as shown in FIG. 8, a lower portion of a radiator 201 (reference numerals used in the official gazette are used) is attached to a lower cross member 204 via a bracket 203 and a resilient member 202 and a boss 209 formed on an upper portion of the radiator 201 is fitted over a cylindrical portion 210 of a resilient member 205, whereby the upper portion of the radiator 201 is attached to an upper cross member 207 via a bracket 206 and the resilient member 205.

In the structure disclosed in the JP-A-60-47826U, as shown in FIG. 9, a lower portion of a radiator 310 is attached to a vehicle body 315 via a lower radiator support 312, and an upper portion of the radiator 310 is attached to the vehicle body 315 via an upper radiator support 311.

In recent years, there has been proposed an engine hood with a shock-absorbing structure in which a distal end portion of the engine hood is made of plastic or the rigidity thereof is reduced, so that the engine hood is deformed when an obstacle hits thereagainst such that a force imparted to the obstacle becomes as small as possible.

Even if the aforesaid shock-absorbing structure is adopted for the engine hood, however, with a radiator being located directly underneath the engine hood, the deflected displacement of the engine hood is suppressed by the radiator.

To cope with this, when it is tried that the radiator attachment structure disclosed in the JP-A-60-46335U is applied to the engine hood with the shock-absorbing structure, the engine hood and the radiator need to be disposed such that a sufficient distance can be secured between them so as to sufficiently absorb an impact that would be imparted to an obstacle that hits against the engine hood. This, however, requires a large space inside the engine compartment and this results in the imposition of a limitation to the structural design of a vehicle. For instance, increases in length and weight of a vehicle will have to be involved.

In addition, even in the radiator attachment structure disclosed in the JP-A-60-47826U, no consideration is given with respect to the structure of the radiator; that is, the radiator is not constructed so as to escape backward or to easily break, and therefore, this structure also includes the drawback inherent in the radiator attachment structure disclosed in the JP-A-60-46335U.

SUMMARY OF THE INVENTION

It is an object of the present invention to provide an attachment structure for a vehicle radiator that does not impose any limitation to the structural design of a vehicle and which can sufficiently absorb the impact that would be applied to the obstacle.

With a view to attaining the aforesaid object, according to the invention, there is provided a radiator attachment structure in which a lower end of a radiator is rotatably attached to a lower cross member and in which an upper end of the radiator is attached to an upper cross member, characterized in that a pin is erected on the upper end of the radiator, and that a resilient supporting portion is provided on the upper cross member which resiliently supports the pin and from which the pin is disengaged when the radiator is moved backward with a force equal to or greater than a certain magnitude.

When the force equal to or greater than a certain magnitude is applied to the radiator, so that the radiator is moved backward, the protruding portion is constructed so as to be disengaged from the resilient supporting portion, whereby the upper end of the radiator is allowed to be moved backward about the lower end thereof. For instance, when an obstacle hits the engine hood, which is then deformed such that the obstacle reaches the radiator, since the radiator is allowed to move backward, an impact applied to the obstacle becomes less than that which would be applied thereto without the structure according to the aspect of the invention. Therefore, no limitation is imposed to the structural design of a vehicle, and for instance, the problem of increasing the overall length of the vehicle and hence the weight thereof can be eliminated.

In the above-mentioned radiator attachment structure according to the present invention, it is advantageous that the resilient supporting portion comprises a bracket attached to the upper cross member, a support rubber attached to the bracket and a fitting hole opened in the support rubber.

The resilient supporting portion is easily constructed by attaching the bracket to the upper cross member, attaching the support rubber to the bracket and opening the fitting hole in the support rubber.

Further, in the above-mentioned radiator attachment structure according to the present invention, it is also advantageous that a slit is provided to the fitting hole for facilitating the disengagement of the pin.

The provision of the slit to the fitting hole facilitates the disengagement of the pin provided on the radiator.

BRIEF DESCRIPTION OF THE DRAWINGS

FIG. 5(a), FIG. 5(b) and FIG. 5(c) are explanatory views of an operation of the radiator attachment structure according to the invention;

FIG. 8 is a plan view of one example of a conventional attachment structure of a vehicle radiator; and.

DETAILED DESCRIPTION OF THE PREFERRED EMBODIMENT

Figure 1:
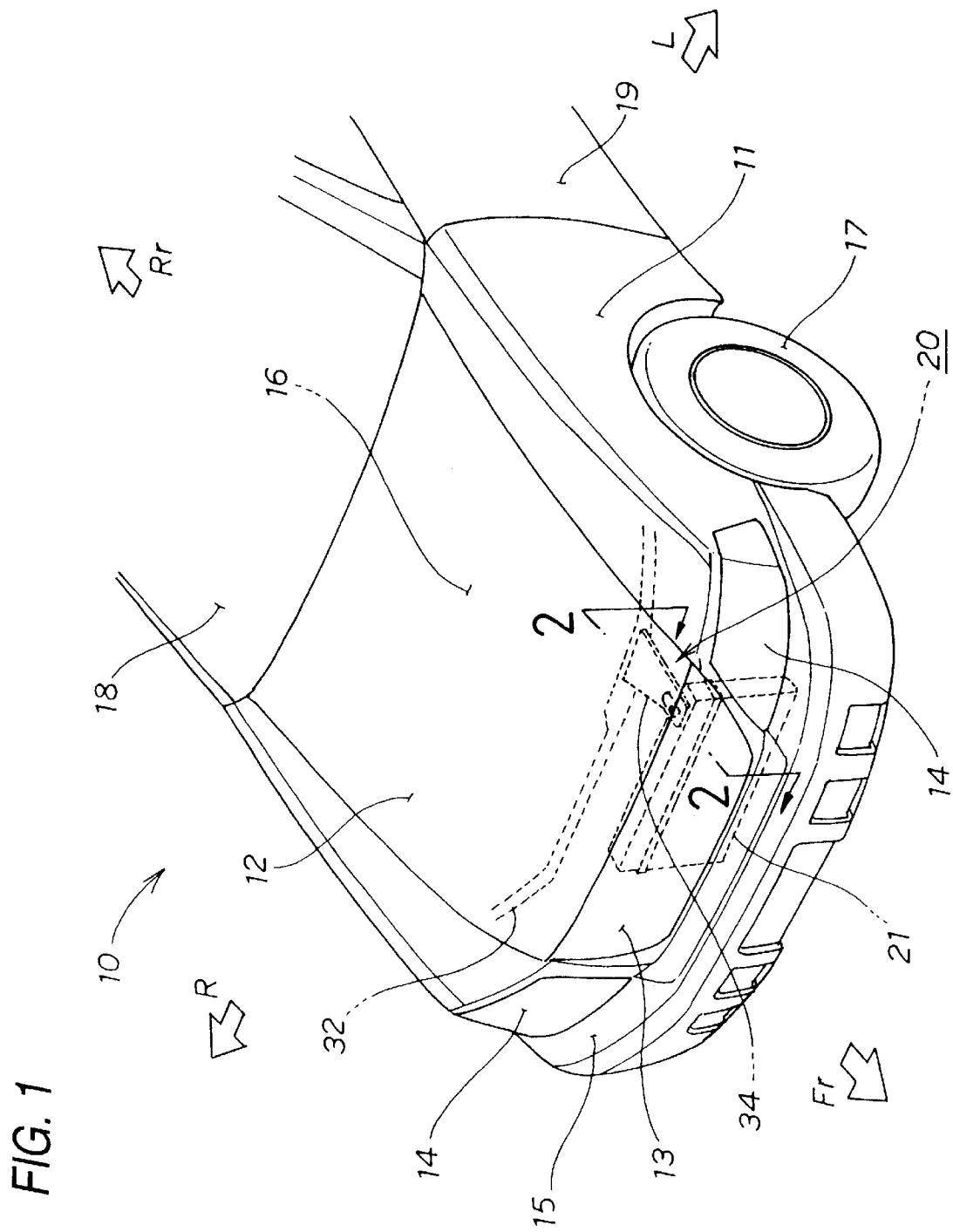
FIG. 1 is a perspective view of a front body of a vehicle to which a vehicle radiator attachment structure according to the invention is applied.

Referring to the accompanying drawings, a mode for carrying out the invention will be described below. In the description, "front," "rear," "left," "right," "up," and "low" denote, respectively, directions as viewed from the driver, and Fr, Rr, L and R denote, respectively, front side, rear side, left-hand side and right-hand side. Moreover, the drawings are to be viewed in directions indicated by reference numerals.

FIG. 1 is a perspective view showing a front body of a vehicle to which the vehicle radiator attachment structure according to the present invention is applied. The front body 10 of the vehicle comprises front fenders 11, 11 (only one of the two is shown) that constitute the front side portions of the vehicle body, an engine hood 12 covering the upper front portion of the vehicle body, a radiator grill 13 for covering the front of the vehicle body, headlamps 14, 14 mounted at the front face of the vehicle body, a bumper 15 provided below these headlamps 14, 14 and radiator grill 13 and an engine compartment 16 constituted by the front fenders 11, 11, engine hood 12, front grill 13 and the bumper 15. A radiator attachment structure 20 of the vehicle (hereinafter, referred to as "radiator attachment structure 20") is an attachment structure for a radiator 21 disposed inside the engine compartment 16.

Reference numerals 17, 17 denoted front wheels, 18 a windscreen and 19, 19 doors (only one of them is shown).

Figure 2:
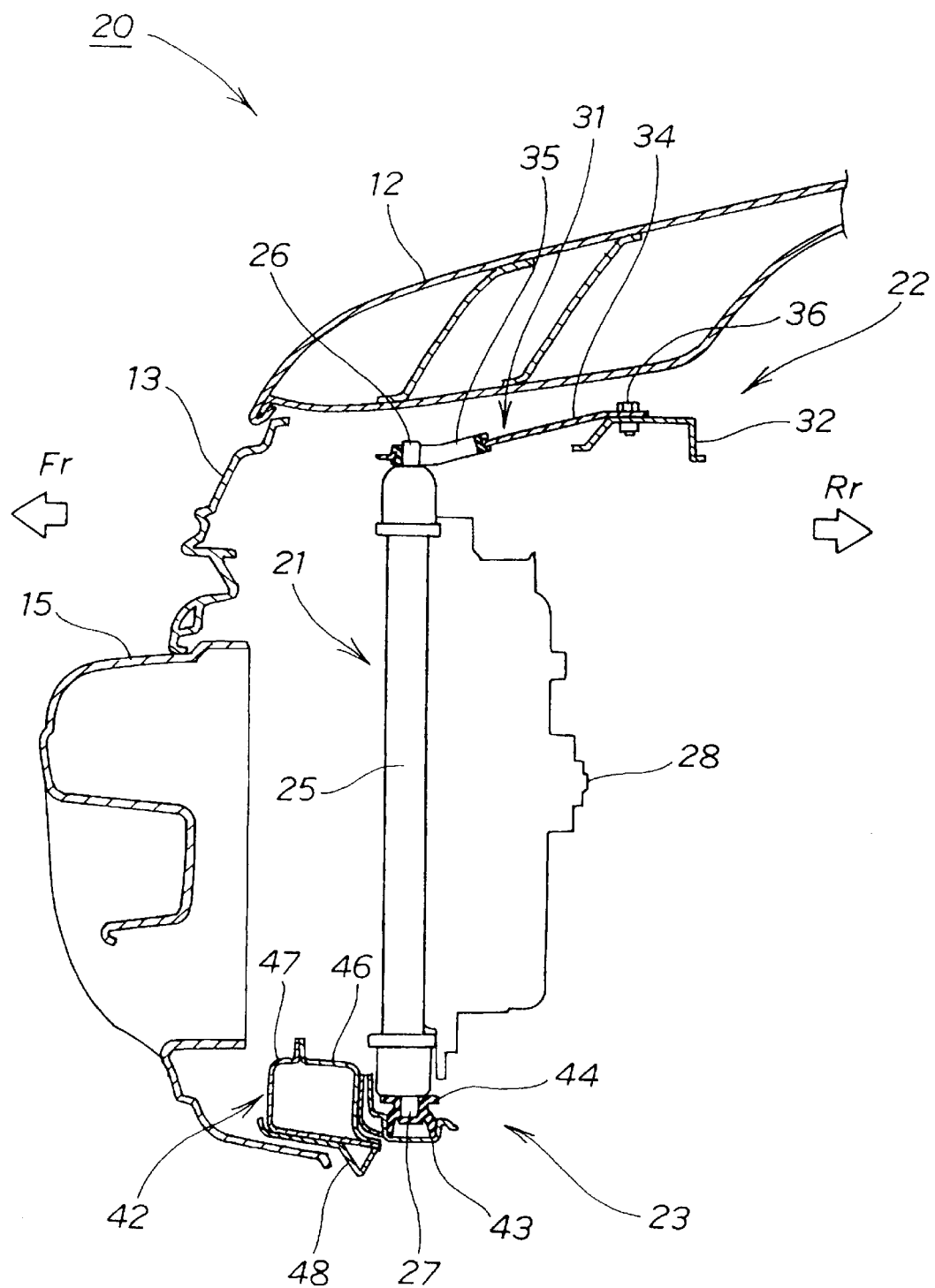
FIG. 2 is a sectional view taken along the line 2—2 of FIG. 1.

FIG. 2 is a sectional view taken along the line 2—2 of FIG. 1, showing a side sectional view of the radiator attachment structure 20.

The radiator attachment structure 20 comprises an upper supporting structure 22 for supporting an upper portion of the radiator 21 and a lower supporting structure 23 for supporting a lower portion of the radiator 21.

The radiator 21 comprises an upper supporting pin 26, which is a pin, attached to an upper end of a main body portion 25 of the radiator 21, a lower supporting pin 27 attached to a lower end of the main body 25, and an electric fan 28 attached to the back of the main body 25.

Figure 3:
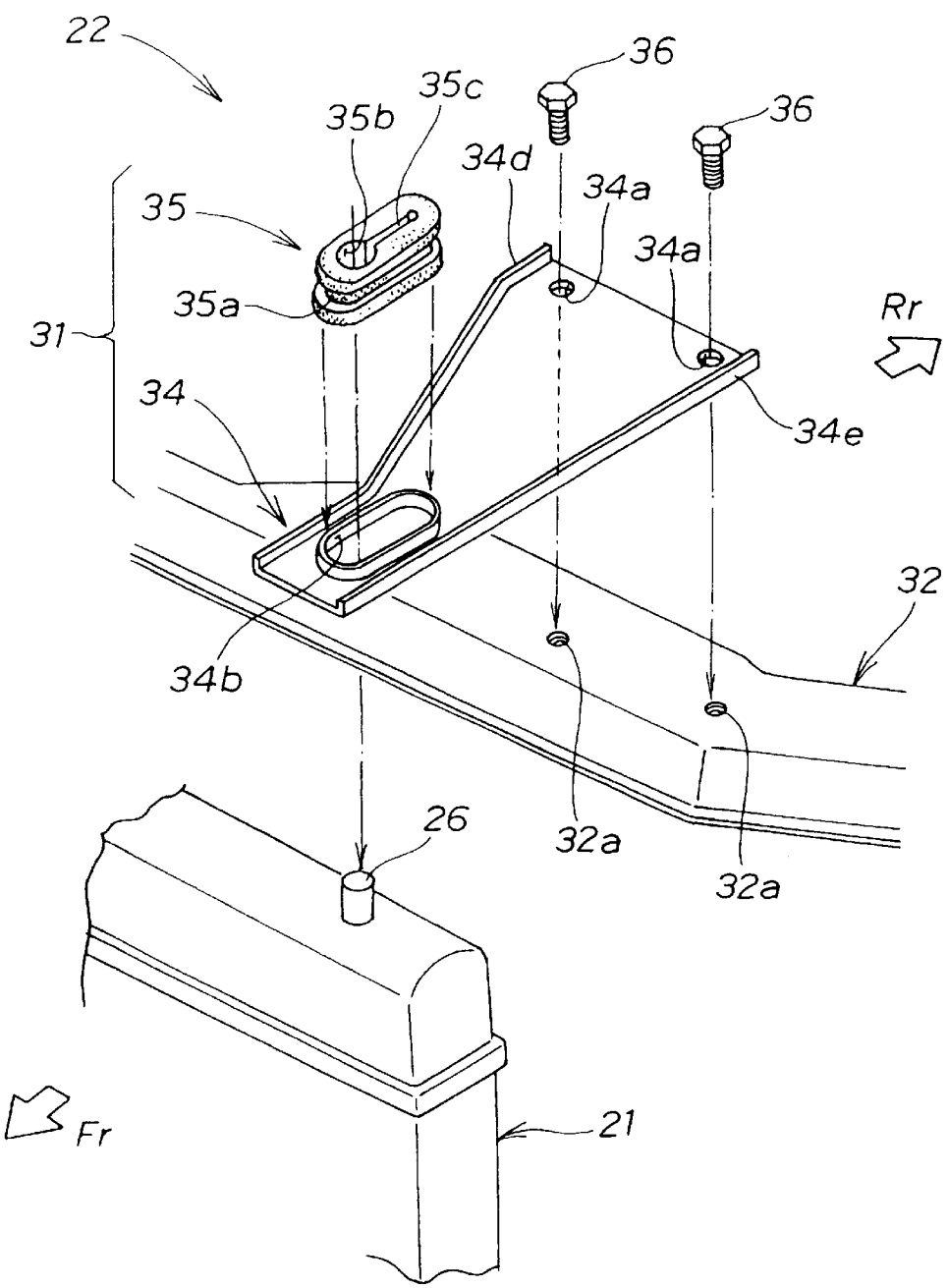
FIG. 3 is an exploded perspective view of an upper supporting structure of the vehicle radiator attachment structure according to the invention.

FIG. 3 is an exploded perspective view of the upper supporting structure of the vehicle radiator attachment structure according to the invention.

The upper supporting structure 22 comprises a resilient supporting portion 31 provided on a cross member 32 for resiliently supporting the upper supporting pin 26 erected at the upper end of the radiator 21 and from which the upper supporting pin 26 is disengaged when the radiator 21 is moved backward with a force equal to or greater than a certain magnitude.

The resilient supporting portion 31 comprises a bracket 34 attached to the upper cross member 32 at one end thereof and an upper support rubber 35, which is a support rubber, attached to the other end of the bracket 34. Reference numerals 36, 36 denote bolts for attaching the bracket 32 to the upper cross member 34, and 32a, 32a denote threaded portions formed in the upper cross member 32.

The upper cross member 32 is provided rearward of the radiator 21 along the vehicle body, and as will be described later, the upper cross member 32 is so positioned that it does not interfere with the locus of the radiator 21 resulting when the radiator 21 is moved backward with a force equal to or greater than a certain magnitude.

The bracket 34 is a substantially flat plate-like member constructed so as to easily be deformed. Through holes 34a, 34a are formed in one end of the bracket through which the bolts 36, 36 are put, and a fitting portion 34b is formed in the other end such that the upper support rubber 35 fits therein. Bent portions 34d, 34e are formed on sides of the bracket 34 for reinforcement thereof.

The support rubber 35 comprises a fitting groove 35a formed therein such that the support rubber fits in the fitting a portion 34b thereat, a fitting hole 35b formed therein such that the upper supporting pin 26 of the radiator 21 fits therein and a slit 35c provided to the fitting hole 35b such that the upper supporting pin 26 can easily be disengaged. In other words, the provision of the slit 35c to the fitting hole 35b facilitates the disengagement of the upper supporting pin 26 of the radiator 21.

Figure 4:
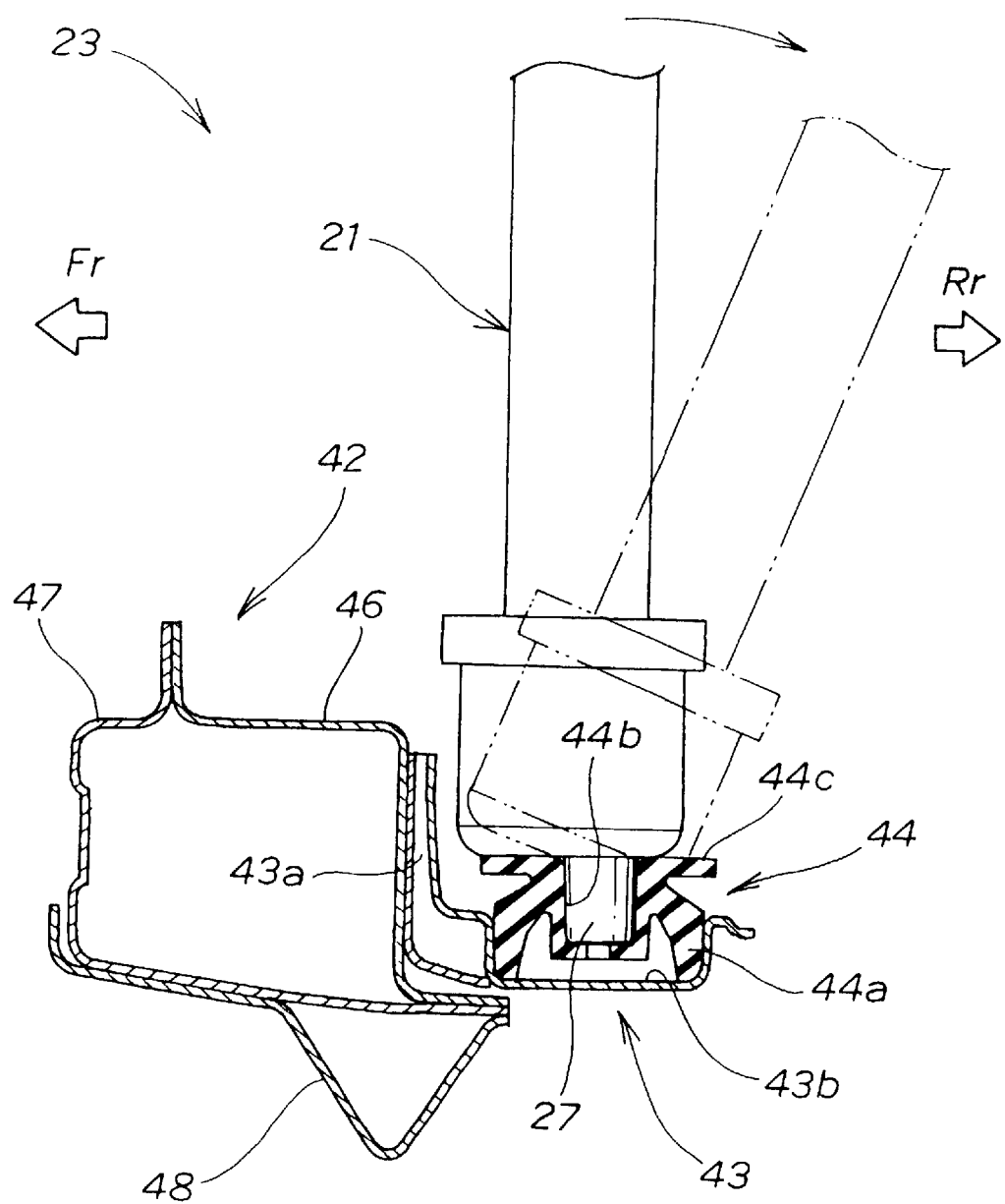
FIG. 4 is a side sectional view of a lower supporting structure of the vehicle radiator attachment structure according to the invention.

FIG. 4 is a side sectional view of the lower supporting structure of the vehicle radiator attachment structure according to the present invention.

The lower supporting structure 23 comprises a lower cross member 42, to which a supporting stay 43 is attached, and the lower supporting pin 27 of the radiator 21 is supported on this stay via a lower support rubber 44. Since the lower support rubber 44 is easy to resiliently deform, the radiator 21 is allowed to swing rearward of the vehicle body as indicated by two-dot chain lines about a point in the vicinity of the lower supporting pin 27.

The lower cross member 42 is disposed forward of the radiator 21 along the vehicle body and comprises an upper frame 46, a lower frame 47 attached to the upper frame 46 and a reinforcement member 48 attached to the lower frame 47.

The supporting stay 43 comprises an attaching portion 43a where the stay is attached to the lower cross member 42 and a supporting portion 43b for supporting the lower support rubber 44.

The lower support rubber 44 is formed of a rubber that easily deforms in a resilient fashion and comprises a leg portion 44a adapted to fit in the supporting portion 43b of the stay 43, a depressed portion 44b adapted to fittingly receive therein the lower supporting pin 27 of the radiator 21, and a supporting surface 44c adapted to support the radiator 21 at the lower end thereof.

Next, an operation of the radiator attachment structure 20 constructed as described above will be described below.

FIGS. 5(a) to (c) explain an operation of the radiator attachment structure according to the present invention.

In FIG. 5(a), an obstacle M hits against the front of the vehicle body from above as shown by an arrow ①.

In FIG. 5(b), crushing the engine hood 12, the obstacle reaches the upper portion of the radiator 21 as shown by ②.

In FIG. 5(c), with the upper supporting pin 26 at the upper end of the radiator 21 being resiliently supported on the upper cross member 32 via the resilient supporting portion 31 comprising the bracket 34 and the support rubber 35, the radiator is attached to the lower cross member 42 such that it swings toward the rear of the vehicle body about the point in the vicinity of the lower supporting pin 27, and therefore, when the obstacle M reaches the upper portion of the radiator 21 as indicated by an arrow ③, the upper supporting pin 26 is disengaged from the resilient supporting portion 31, and the radiator 21 swings toward the rear of the vehicle body as indicated by an arrow ④ about the lower supporting pin 27. In other words, since the radiator 21 can be moved backward, no force is applied to the obstacle M which is greater than a force that would be applied thereto without the aforesaid radiator attachment structure. Consequently, a minimum distance can be secured between the engine hood 12 and the radiator 21, and therefore, no limitation is to be imposed on the structural design of a vehicle. Thus, there is involved no risk of, for instance, the overall length of the vehicle and hence the weight thereof being increased.

In addition, since the upper cross member 32 is provided rearward of the radiator 21 along the vehicle body such that the upper cross member 32 does not interfere with the locus of the radiator 21, the radiator 21 can swing toward the rear of the vehicle body without hitting against the upper cross member 32.

Figure 6A:
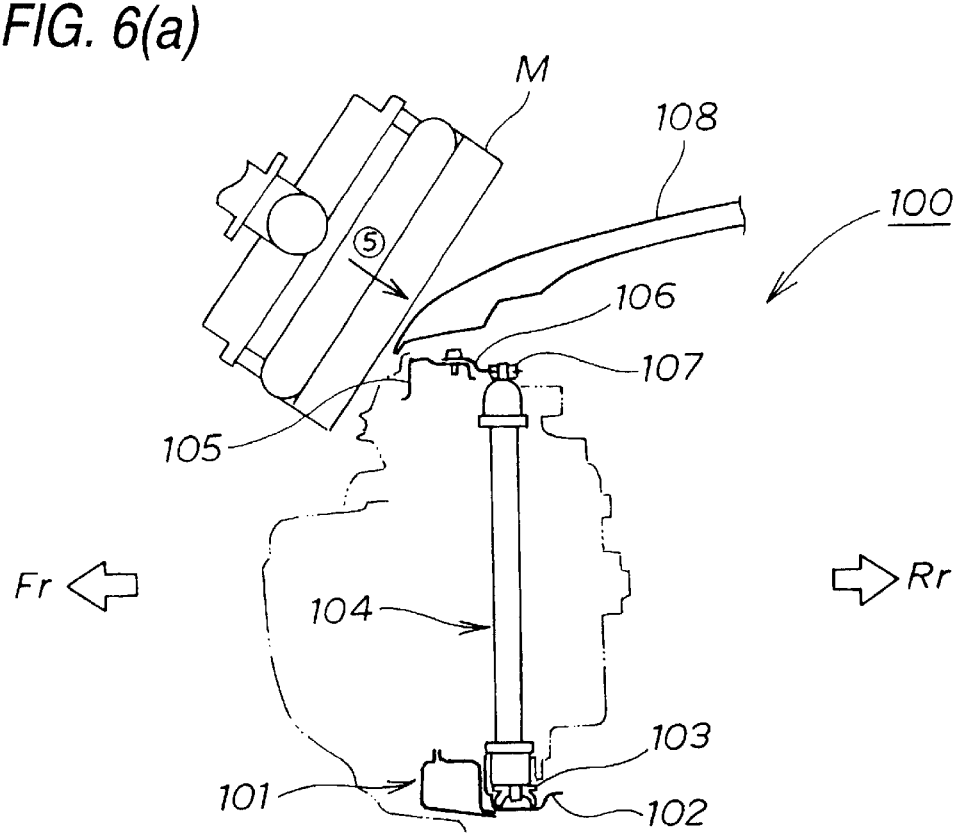
FIG. 6(a) and FIG. 6(b) are explanatory views of an operation of an example comparable to the radiator attachment structure according to the invention.
Figure 6B:
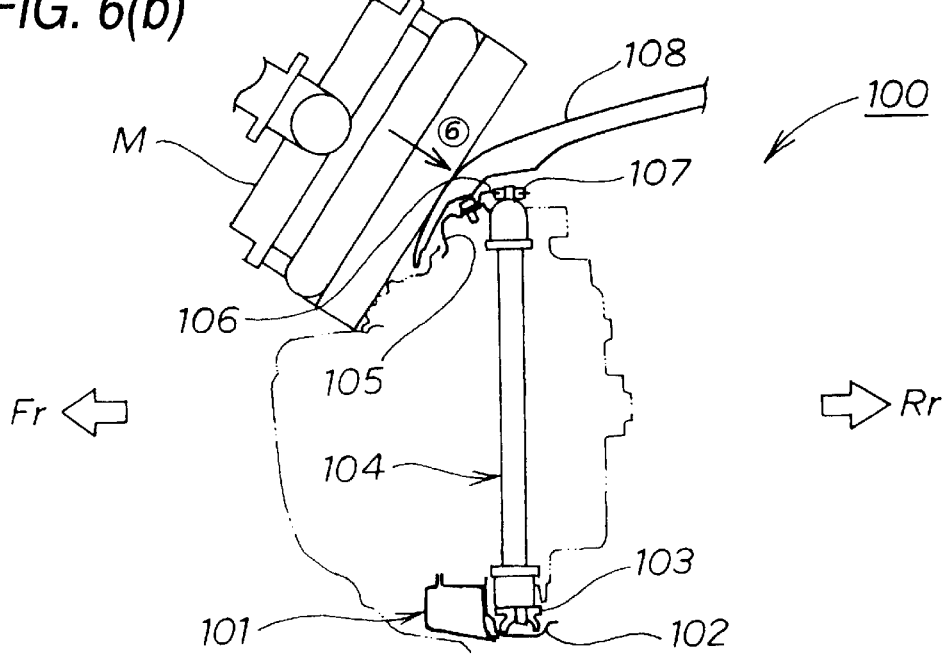

FIGS. 6(*a*), (*b*) are explanatory views describing an operation of an example comparable to the radiator attachment structure according to the present invention.

In FIG. 6(*a*), in a radiator attachment structure 100 comparable to that of the present invention, a lower end of a radiator 104 is supported on a lower cross member 101 via a supporting stay 102 and a lower support rubber 103, and an upper end of the radiator 104 is rigidly attached to an upper cross member 105 disposed forward of the radiator 104 via a bracket 106 and an upper support rubber 107. An obstacle M hits against an engine hood 108 from the front of the vehicle as indicated by an arrow ⑤.

In FIG. 6(*b*), the obstacle M crushes the engine hood 108 as indicated by an arrow ⑥, hits against the upper cross member 105 and reaches the radiator 104. Therefore, a force of large magnitude is eventually applied to the obstacle M. For instance, with the upper cross member 105 being disposed rearward of the radiator 104, even if the obstacle M directly hits against the radiator 104 without the interposition of the upper cross member 105, since the radiator 104 is not constructed such that the radiator 104 swings at the upper end thereof about the lower end thereof, an impact of great magnitude is eventually applied to the obstacle M.

Figure 7:
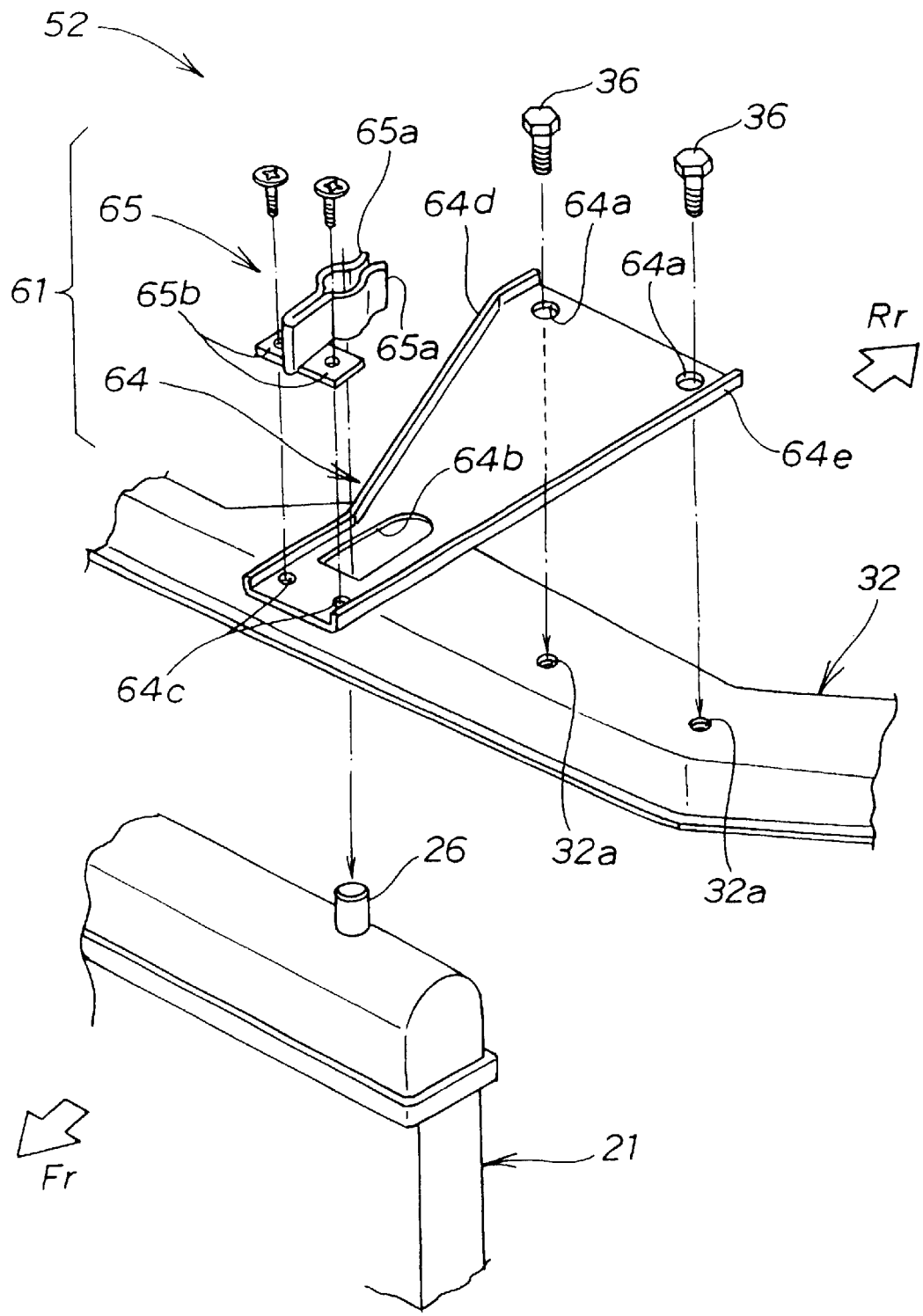
FIG. 7 is an exploded perspective view of another embodiment of an upper supporting structure of the radiator attachment structure according to the invention.
Figure 8:
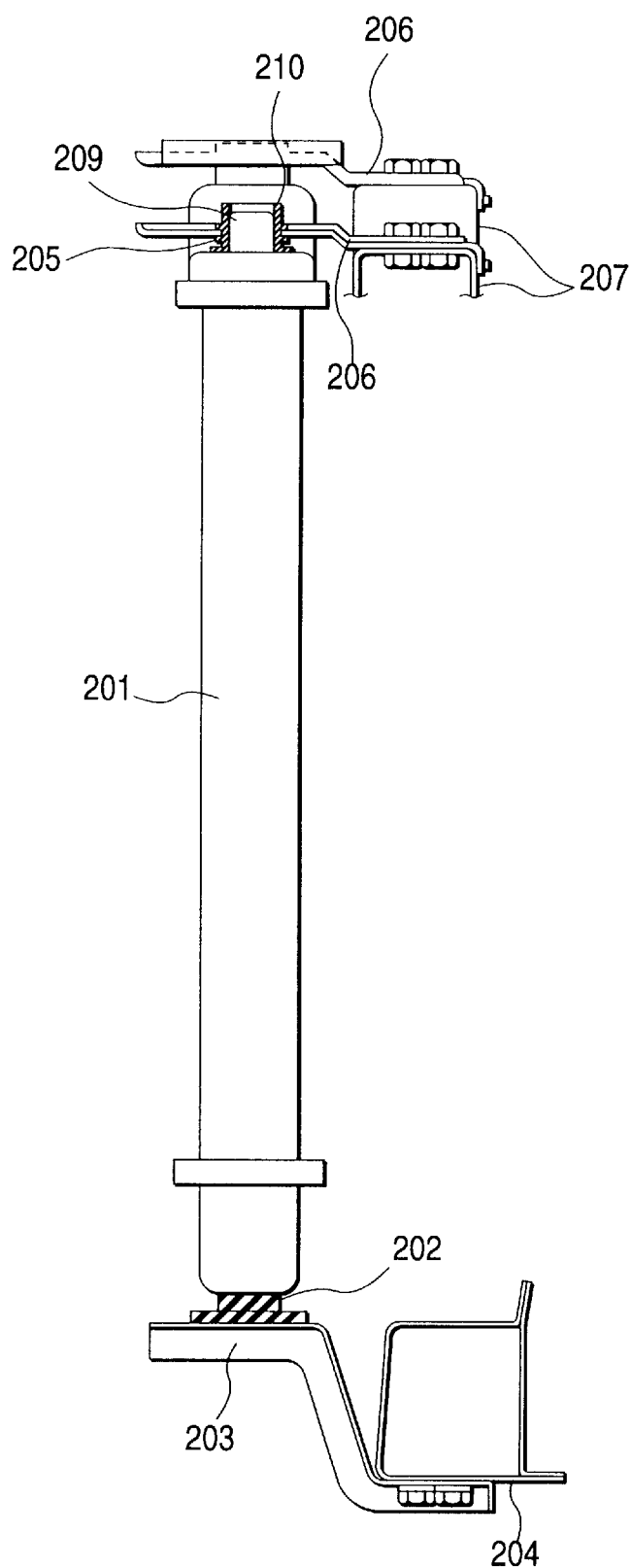
Figure 9:
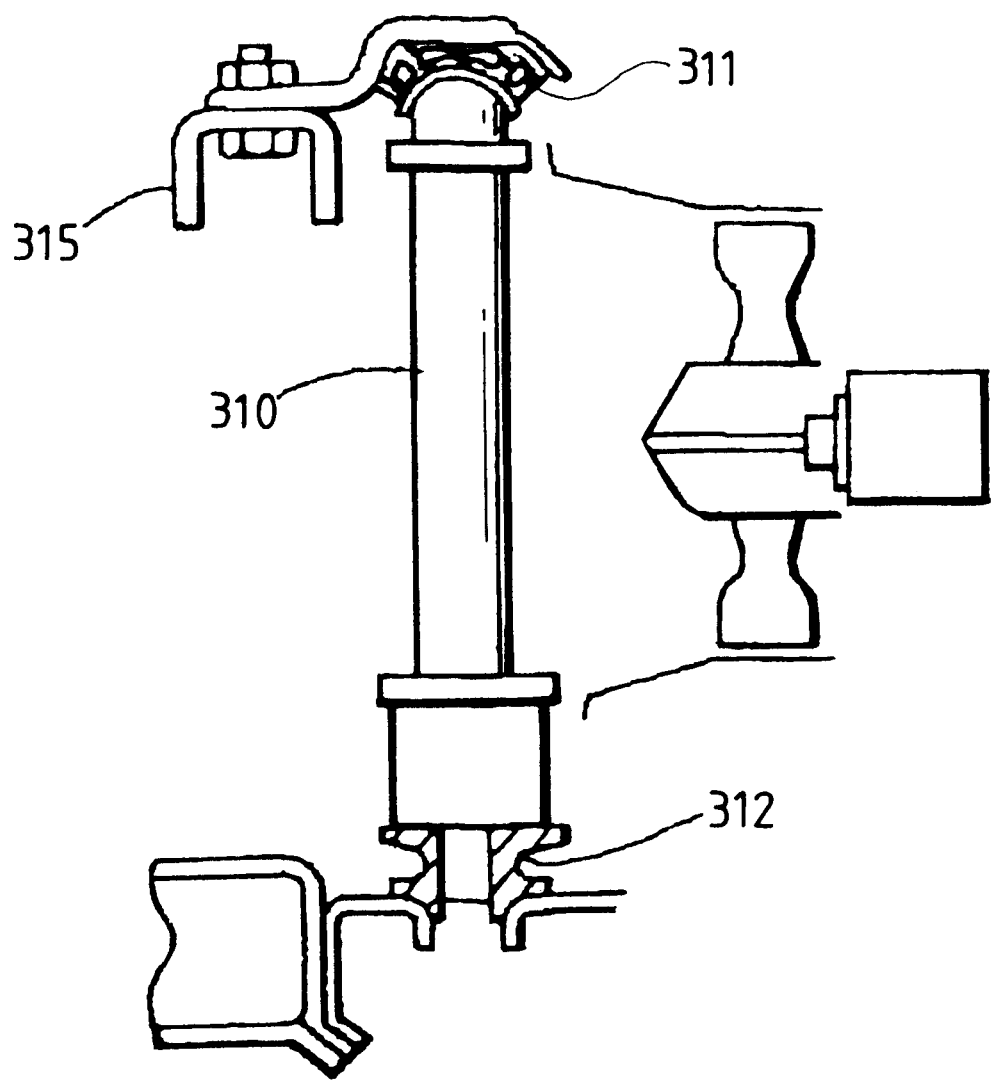
FIG. 9 is a plan view of the other example of a conventional attachment structure of a vehicle radiator.

FIG. 7 is an exploded perspective view of another embodiment of an upper supporting structure of the radiator attachment structure according to the present invention. In the figure, like reference numerals are given to components like to those described with respect to the upper supporting structure 22, and detailed descriptions of those like components will be omitted.

In an upper supporting structure 52, a resilient supporting portion 61 is provided on an upper cross member 32 which is adapted to resiliently supports an upper supporting pin 26 erected at an upper end of a radiator 21 and from which the upper supporting pin 26 is disengaged when the radiator 21 is moved backward with a force equal to or greater than a certain magnitude.

The resilient supporting portion 61 comprises a bracket 64 attached to the upper cross member 32 at one end thereof and a spring member 65 attached to the other end of the bracket 64.

The bracket 64 is a substantially flat plate-like member constructed so as to easily be deformed, and through holes 64*a*, 64*a* are formed in one end of the bracket 64 through which bolts 36, 36 are put, while formed in the other end thereof are a rectangular hole 64*b* through which the pin of the radiator 21 is put and mounting holes 64*c*, 64*c* for the spring member. In addition, bent portions 64*d*, 64*d* are formed on sides of the bracket for reinforcement thereof.

The spring member 65 is bent from a resilient member and comprises substantially U-shaped spring portions 65*a*, 65*a* for holding the upper supporting pin 26 therebetween and attaching portions 65*b*, 65*b* adapted to be attached to the bracket 64.

In this embodiment, as shown in FIG. 3, the single upper supporting pin 26 is described as being erected at the upper end of the radiator 21 and supported by the single resilient supporting portion 31, but the present invention is not limited to that construction, and it may be constructed such that a plurality of pins are provided at the upper end of the radiator and that the plurality of pins are supported by a plurality of resilient supporting portions, respectively.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

With the above constructions according to the invention, when the force equal to or greater than a certain magnitude is applied to the radiator, so that the radiator is moved backward, the protruding portion is constructed so as to be disengaged from the resilient supporting portion, whereby the upper end of the radiator is allowed to be moved backward about the lower end thereof. Therefore, for instance, when an obstacle hits the engine hood, which is then deformed such that the obstacle reaches the radiator, the radiator is allowed to move backward. Consequently, the obstacle can be free from the imposition of an impact greater than that which would be applied thereto without the structure according to the aspect of the invention.

In addition, since the radiator is constructed so as to be moved backward, for instance, a minimum required distance can be secured between the engine hood and the radiator. Therefore, no limitation is imposed to the structural design of a vehicle, a great degree of freedom in structural design being thereby provided.

According to the present invention, since the resilient supporting portion comprises the bracket attached to the upper cross member, the support rubber attached to the bracket and the fitting hole opened in the support rubber, the resilient supporting member can be simplified in construction, whereby the production costs can be reduced.

According to the invention, since the slit is provided to the fitting hole, the disengagement of the pin can further be facilitated, whereby a force can further be reduced which results when the obstacle so hits against the engine hood that the engine hood is deformed to the extent that the obstacle is allowed to reach the radiator.

What is claimed is:

1. A radiator attachment structure comprising:
    a lower support member attaching a lower end of a radiator to a lower cross member of a vehicle; and
    an upper support member attaching an upper end of said radiator to an upper cross member of said vehicle, wherein said upper support member includes
        (a) an upper pin erected on the upper end of said radiator, and
        (b) a resilient supporting portion provided on said upper cross member which resiliently supports said upper pin,
    wherein said resilient supporting portion is constructed to disengage from said upper pin when a predetermined force is applied to said radiator.

2. The radiator attachment structure as set forth in claim 1, wherein said resilient supporting portion comprises:
    a bracket attached to said upper cross member, and
    a support rubber attached to said bracket, said support rubber having a fitting hole into which said upper pin is insertable.

3. A radiator attachment structure as set forth in claim 2, wherein a slit is provided in said supporting rubber and contiguous with said fitting hole for facilitating the disengagement of said upper pin from said resilient supporting portion.

4. The radiator attachment structure as set forth in claim 2, wherein said bracket is deformable, and said bracket has one end attached to said upper cross member and another end on which said supporting rubber is provided.

5. The radiator attachment structure as set forth in claim 1, wherein said lower support member comprises:

a lower pin erected on the lower end of said radiator;

a supporting stay attached said lower cross member; and a resiliently deformable lower support rubber mounted on said supporting stay and engaged with said lower pin for supporting said radiator, while allowing said radiator to swing rearward about a point in the vicinity of said lower pin when said radiator is disengaged from said resilient supporting portion.

6. The radiator attachment structure as set forth in claim 1, wherein said resilient supporting portion comprises a bracket securely attached to said upper cross member, and a spring member attached to said bracket for resiliently supporting said upper pin.

7. A radiator attachment structure as set forth in claim 6, wherein said bracket is provided with a hole through which said upper pin is put.

8. The radiator attachment structure as set forth in claim 6, wherein said bracket is deformable, and said bracket has one end securely attached to said upper cross member and the other end on which said hole is provided.

* * * * *